United States Patent [19]

Bakker et al.

[11] Patent Number: 5,959,067
[45] Date of Patent: Sep. 28, 1999

[54] ALKYD RESINS HAVING A LOW DYNAMIC VISCOSITY FOR USE IN HIGH-SOLIDS COATINGS

[75] Inventors: Petrus Josephus Bakker, Bergen op Zoom; Dick Boekee, Voorhout, both of Netherlands

[73] Assignee: Akzo Nobel N.V., Arnhem, Netherlands

[21] Appl. No.: 09/159,214

[22] Filed: Sep. 23, 1998

Related U.S. Application Data

[63] Continuation of application No. PCT/EP97/01361, Mar. 18, 1997
[60] Provisional application No. 60/015,879, Apr. 22, 1996.

[30] Foreign Application Priority Data

Mar. 27, 1996 [EP] European Pat. Off. .............. 96200824

[51] Int. Cl.$^6$ .................................................. C08G 63/54
[52] U.S. Cl. .................. 528/295.3; 528/272; 528/295.5; 528/300; 528/301; 528/302; 528/303; 528/304; 528/306; 528/361; 428/480
[58] Field of Search ................................. 528/272, 295.3, 528/295.5, 300, 301, 302, 303, 304, 306, 361; 428/480

[56] References Cited

U.S. PATENT DOCUMENTS

| | | | |
|---|---|---|---|
| 3,900,336 | 8/1975 | Lubbock et al. | 106/252 |
| 4,116,902 | 9/1978 | Harris et al. | 260/22 |
| 4,317,894 | 3/1982 | Lewarchik et al. | 525/455 |
| 4,335,027 | 6/1982 | Cremeans et al. | 528/281 |
| 4,511,692 | 4/1985 | Anderson et al. | 525/7 |
| 4,798,859 | 1/1989 | Hohlein et al. | 525/7 |
| 5,053,483 | 10/1991 | Knox | 528/295.5 |
| 5,055,530 | 10/1991 | Inoue | 525/423 |
| 5,096,960 | 3/1992 | Knox | 524/601 |
| 5,158,608 | 10/1992 | Sodhi | 106/244 |
| 5,378,757 | 1/1995 | Blount, Jr. et al. | 524/608 |
| 5,530,059 | 6/1996 | Blount, Jr. et al. | 524/604 |
| 5,569,715 | 10/1996 | Grandhee | 525/7 |

FOREIGN PATENT DOCUMENTS

| | | |
|---|---|---|
| 3 734 440 | 6/1989 | Germany. |
| WO 93/17060 | 9/1993 | WIPO. |

OTHER PUBLICATIONS

Paint and Surface Coatings: Theory and practice, R. Lambourne, 1987, p. 39.
"Maleic Treated Oils" by C.P.A. Kappelmeier, et al., *Paint, Oil & Chemical Review*, Aug. 31, 1950 (pp. 11–18 & 31).
"Reaction of Maleic Anhydride with cis–Isolated Unsaturated Fatty Acid Esters" by Prof. D.A.E.Rheineck, et al., *DERFARBENCHEMIKER/Nr.4*, Aug. 1969 (pp. 16–24).
"A Method to Elucidate The Structure of Maleinized Linseed Oil" by J.T.K. Woo, et al., *Journal of Coatings Technology*, vol. 49, No. 630, Jul. 1977 (pp. 42–50).

*Primary Examiner*—Samuel A. Acquah
*Attorney, Agent, or Firm*—David H. Vickrey

[57] ABSTRACT

The current invention relates to an alkyd resin particularly useful in high-solids coating compositions. The alkyd resin comprises the reaction product of an unsaturated fatty acid, a polyol, and the adduct of an $\alpha,\beta$-unsaturated dicarboxylic acid to an unsaturated fatty acid wherein the resin contains a) about 5 to about 40 weight % of the adduct of an $\alpha,\beta$-unsaturated dicarboxylic acid to an unsaturated fatty acid, b) about 50 to about 90 weight % of an unsaturated fatty acid which is not part of an adduct, c) about 8 to about 18 weight % of a polyol free from carboxylic groups, d) about 1 to about 30 weight % of an at least two hydroxyl groups-containing monocarboxylic acid, e) optionally, up to about 10 weight % of a dicarboxylic and/or a tricarboxylic acid, and f) optionally, up to 15 weight % of one or more monomers other than the monomers (a) through (e).

Also disclosed is their use in coating compositions, particularly high-solids coating compositions having a VOC of less than 170.

12 Claims, No Drawings

ALKYD RESINS HAVING A LOW DYNAMIC VISCOSITY FOR USE IN HIGH-SOLIDS COATINGS

This application claims benefit of Provisional Application 60/015,879, filed Apr. 22, 1996. This is a Continuation of International Application PCT/EP97/01361, with an international filing date of Mar. 18, 1997.

FIELD OF THE INVENTION

This invention relates to alkyd resins and their use in coatings compositions.

BACKGROUND OF THE INVENTION

Coating compositions comprising the adduct of an α,β-unsaturated dicarboxylic acid to an unsaturated fatty acid, a polyol esterified with an autoxidisable monocarboxylic fatty acid, and an at least two hydroxyl groups-containing monocarboxylic acid, such as dimethylol propionic acid, are known per se from GB-A-1 471 611. However, the binder composition disclosed therein is essentially non-polymeric and moreover comprises a polyol partly esterified with acrylic and/or methacrylic acid. Though the disclosed autoxidisable compounds permit the formulation of quick-drying paints at "very high application solids," due to the presence of acrylyl or methacrylyl groups these paints tend to be unstable under normal storage conditions over typical storage times; that is, they have a problem with what is conventionally known as "pot-life stability."

WO-A-93/17060 discloses the preparation of high-molecular weight alkyd resins starting from polyols, a chain extender such as dimethylol propionic acid, and an unsaturated fatty acid. In this manner dendrimer-type macromolecules are obtained. However, the process of preparing said alkyd resins is cumbersome, as it requires the use of strong acids, such as sulphuric acid and methane sulphonic acid, for proper conversion to dendrimeric material. It should therefore be considered highly surprising that the use of a chain extender as disclosed in WO-A-93/17060 in an alkyd resin composition as disclosed in U.S. Pat. No. 5,053,483 provides alkyd resins which can be used in coating compositions of very low VOC while producing cured films having improved physical characteristics. The invention relates to an alkyd resin comprising an unsaturated fatty acid, a polyol, and the adduct of an α,β-unsaturated dicarboxylic acid to an unsaturated fatty acid. Alkyd resins of said type have earlier been proposed in U.S. Pat. No. 5,053, 483. The resins disclosed therein comprise a fatty acid drying component, a polyol, a dibasic acid component, and a fatty acid-based trifunctional acid component, wherein a portion of the trifunctional acid component is a 22-carbon aliphatic acid anhydride which is a Diels-Alder adduct of maleic anhydride to linoleic or linolenic acid.

Though the known alkyd resins have a significantly reduced viscosity, allowing for formulations with reduced amounts of solvents, the performance of the cured films produced therefrom is poorer in terms of durability, such as cracking and gloss retention. Moreover, there is a constant need in the art for non-aqueous coating compositions having a reduced volatile organic content (VOC).

It is an object of the present invention to provide an alkyd resin which makes it possible to provide coating compositions of very low VOC while producing cured films having improved physical characteristics.

SUMMARY OF THE INVENTION

The invention comprises an alkyd resin comprising:

a) about 5 to about 40 weight % of the adduct of an α,β-unsaturated dicarboxylic acid to an unsaturated fatty acid, b) about 50 to about 90 weight % of an unsaturated fatty acid which is not part of an adduct, c) about 8 to about 18 weight % of a polyol free from carboxylic groups, d) about 1 to about 30 weight % of an at least two hydroxyl groups-containing monocarboxylic acid, e) optionally, up to about 10 weight % of a dicarboxylic and/or a tricarboxylic acid, and f) optionally, up to about 15 weight % of one or more monomers other than the monomers (a) through (e).

The invention also comprises a coating composition comprising the above alkyd resin.

DETAILED DESCRIPTION

The invention relates to an alkyd resin comprising an unsaturated fatty acid, a polyol, and the adduct of an (α,β-unsaturated dicarboxylic acid to an unsaturated fatty acid. Alkyd resins of said type have earlier been proposed in U.S. Pat. No. 5, 053, 483. The resins disclosed therein comprise a fatty acid drying component, a polyol, a dibasic acid component, and a fatty acid-based trifunctional acid component, wherein a portion of the trifunctional acid component is a 22-carbon aliphatic acid anhydride which is a Diels-Alder adduct of maleic anhydride to linoleic or linolenic acid.

For the preparation of the adduct of the α,β-unsaturated dicarboxylic acid to an unsaturated fatty acid (monomer (a)), use may be made of α,β-unsaturated carboxylic acids, in the acid as well as the anhydride form. Non-limiting examples of such α,β-unsaturated dicarboxylic acids are maleic acid, fumaric acid, itaconic acid, mesaconic acid, methyl maleic acid, ethyl maleic acid, and mixtures thereof. Other α,β-unsaturated dicarboxylic acids are also known in the art of resin formation and accordingly need not be set forth in full detail here.

Unsaturated fatty acids useful in the present invention are also well-known in the art, particularly in the art of alkyd resin preparation. These unsaturated fatty acids are typically known to a skilled artisan and are suitable both for the preparation of the adduct (monomer (a)) and for use as the unsaturated fatty acid which is not part of the adduct (monomer (b)). The first unsaturated fatty acid and the second unsaturated fatty acid may be the same fatty acid or different fatty acids. Natural and synthetic unsaturated fatty acids, as well as mixtures of various natural fatty acids, mixtures of various synthetic fatty acids, and mixtures of natural and synthetic fatty acids can be used. One type of unsaturated fatty acids useful herein is obtainable from natural dying oils. "Natural drying oils" as used herein include the oils themselves as well as the transesterification products of such oils with polyols, in particular the polyols mentioned below.

Saturated fatty acids finding use herein usually have at least 10 carbon atoms, typically about 10 to about 24, preferably about 16 to about 22 carbon atoms, most preferably about 18 to about 20. Dimers having about 36 to about 44 carbon atoms and trimers having about 44 to about 66 carbon atoms may also be used. Typical, but non-limiting examples of unsaturated fatty acids useful in the invention are dehydrated castor oil fatty acid, linoleic acid, and linolenic acid. Further non-limiting examples of useful natural oil fatty acids are tall oil fatty acid, sunflower oil fatty acid, corn oil fatty acid, cottonseed oil fatty acid, lard fatty acid, mustard seed fatty acid, olive oil fatty acid, palm oil fatty acid, peanut oil fatty acid, linseed oil fatty acid, soybean oil fatty acid, rapeseed oil fatty acid, rice bran oil fatty acid, safflower oil fatty acid, sesame oil fatty acid, and tallow fatty acid. Mixtures of unsaturated fatty acids may also be used. Preferably, for the preparation of the adduct use is made of dehydrated castor fatty acid or linseed fatty acid and for monomer (b) of tall oil fatty acid, soybean oil fatty acid or sunflower oil fatty acid.

The adduct (monomer (a)) is produced by an addition reaction between an α,β-unsaturated dicarboxylic acid and an unsaturated fatty acid of the types already mentioned. Such addition reactions are well-known in the art, for example, from C.P.A. Kappelmeyer and J. A. van der Neut, "Maleic Treated Oils," *Paint Oil Chemistry*, Rev. 113 (81), 11 (1950); A. E. Rheineck and T. H. Khoe, "Reaction of Maleic Anhydride with cis-Isolated Unsaturated Fatty Acid Esters," *Der Farbenchemiker*, No. 4, August 1969, pages 16–24, and J. T. K. Woo and J. M., Evans, "A Method to Elucidate the Structure of Maleinized Linseed Oil," *Journal of Coatings Technology*, Vol.49, No.630, July 1974, pages 43–50. Accordingly, they need not be described in great detail here. They are also further demonstrated by the examples that follow this description. In general, such reactions are carried out at temperatures between about 100° C. and about 220° C. in an inert atmosphere. The α,β-unsaturated dicarboxylic acid and the unsaturated fatty acid are typically reacted at a molar ratio of about 0,8:1 to about 1:1,2, more preferably about 0,9:1 to about 1,0:1, calculated on the conjugated fraction of the unsaturated fatty acid.

Polyols having at least two hydroxyl groups and no carboxyl groups (monomer (c)) are also well-known in the art. All can be used in the practice of the invention. Non-limiting examples include ethylene glycol, propylene glycol, 1,4-butane diol, neopentyl glycol, glycerol, trimethylol ethane, trimethylol propane, pentaerythritol, dipentaerythritol, tripentraerythritol, tetrapentaerythritol, hexane diol, cyclohexane diols, sorbitol, glucosides, and mixtures thereof.

Examples of monocarboxylic acids having at least two hydroxyl groups (monomer (d)) include 2,2-dimethylol propionic acid, 2,2-dimethylol butyric acid, 2,2,2-trimethylol acetic acid, 2,2-dimethylol valeric acid, 2,2-hydroxypropionic acid, and α-phenylcarboxylic acids having at least two hydroxyl groups directly pendant to the phenyl ring, such as 3,5-dihydroxybenzoic acid. Relevant monocarboxylic acids also include those wherein one or more of the at least two hydroxyl groups are hydroxyalkyl-substituted. Mixtures of the mentioned monocarboxylic acids, including the mentioned hydroxyalkyl-substituted monocarboxylic acids, may also be used.

Optional monomer (e) is a diacid or a triacid. Diacids and triacids potentially useful in the invention are also well-known in the alkyd resin art and need not be fully recited here. Such di- and triacids may be aliphatic, cycloaliphatic or aromatic. Representative, non-limiting examples are isophthalic acid, 1,4 cyclohexane dicarboxylic acid, trimellitic anhydride, isomeric benzene tricarboxylic acids, isomeric naphthalene tricarboxylic acid, and mixtures thereof.

The alkyd resin of the current invention may also comprise one or more additional monomers (collectively referred to as "monomer f"). Typical, though non-limiting additional monomers are ε-caprolactone, benzoic acid, p-tert. butyl benzoic acid, and adducts of fatty acids with dicyclopentadiene.

The concentration of the various monomers (a) through (f) can be varied by the artisan, depending on the properties desired in a coating composition and in the resulting coating. As a rule of thumb, monomer (a) is about 5 to about 40, preferably about 10 to about 30, weight % of the monomers provided to make an alkyd resin according to the invention, monomer (b) is about 50 to about 90, preferably about 70 to about 85, weight % monomer (c) is about 8 to about 18, preferably about 10 to about 14, weight % monomer (d) is about 1 to about 30, preferably about 2 to about 18, weight %, monomer (e), if present, is up to about 10 weight %, and monomer (f), if present, is up to about 15 weight %. In a preferred embodiment of the invention, the sum of the weight % of monomers (a) through (f) is 106%. In a more preferred embodiment, the sum of the weight % of monomers (a) through (e) is 106%. More preferred still is an embodiment wherein the sum of the weight % of monomers (a) through (d) is 106%.

The alkyd resins of the invention typically have a weight average molecular weight (Mw) of about 3000 to about 30 000, preferably about 10 000 to about 16 000; a number average molecular weight (Mn) of about 1000 to about 3000, preferably about 1000 to about 2000; an acid number of about 5 to about 20, and a hydroxyl number of about 20 to about 50.

The alkyd resins of the invention typically have an average functionality of about 1,8 to about 2,1, preferably between about 1,85 and about 1,95. "Average functionality" of the alkyd resin here means 2 times the number of equivalents of the acid groups in the initial mixture divided by the total number of moles in the initial mixture.

Preferred coating compositions of the invention are high-solids coating compositions and accordingly preferably have a solids content between about 72 and about 85, more preferably between about 82 and about 85.

The polycondensation reaction for the preparation of the alkyd resin may, in general, be carried out under conditions known in the art of alkyd resin synthesis. For example, the reaction is typically carried out in an inert atmosphere (e.g., nitrogen and/or carbon dioxide) at a temperature of about 140° C. to about 300° C., preferably at about 180° C. to about 260° C. The water produced by the polycondensation reaction can be removed by methods known in the art, for example, distillation under reduced pressure or azeotropic distillation with an organic solvent, such as xylene. If desired, the azeotropic distillation solvent may be removed from the alkyd resin by distillation after termination of the polycondensation reaction. Esterification catalysts known in the art, such as phosphoric acid, sulphuric acid, p-toluene sulphonic acid, benzene sulphonic acid, naphthalene sulphonic acid, and metal compounds, e.g., dibutyltin oxide and dibutyltin dilaurate, may also be used.

Alkyd resins of the invention find particular use in coating compositions, especially in high-solids coating compositions. In addition to the alkyd resins disclosed above, coating compositions of the invention also comprise an organic solvent. The organic solvent is typically present as about 10 to about 40 weight %, preferably about 10 to about 30 weight %, most preferably about 10 to about 18 weight %, of the coating composition. Suitable organic solvents are wellknown in the art, and, in principle, all can be used in the coating compositions contemplated herein. Non-limiting examples of suitable organic solvents are aliphatic, cycloaliphatic, and aromatic hydrocarbons containing on average 9 to 16 carbon atoms per molecule, alcohol ethers, and alcohol ether acetates or mixtures thereof. As examples of such solvents may be mentioned hydrocarbon solvents available under the trademarks Shellsol H, Shellsol K, and Shellsol AB, all from Shell Chemicals, the Netherlands, the trademarked Solvesso 150 solvent from Esso, and solvents such as ethyl diglycol, ethyl glycol acetate, butyl glycol, butyl glycol acetate, butyl diglycol, butyl diglycol acetate, and methoxypropylene glycol acetate. Mixtures of solvents may also be used.

Siccatives may also be present in the alkyd resins and coating compositions of the invention. Example siccatives are metal salts of aliphatic acids including cycloaliphatic acids, such as octanoic acid and naphthenic acid, where the metal is, for example, cobalt, manganese, lead, zirconium, calcium, zinc, and rare earth metals. Typically, mixtures of siccatives are used. Preferred metal salts are salts of cobalt, zirconium and calcium, and mixtures of these selected metal salts. The siccatives (calculated as metal) are usually applied in an amount of 0,001 to 3 weight %, calculated on the alkyd resin solids content.

Coating compositions according to the invention may optionally comprise various additives and adjuvants known in the art of formulation of alkyd coating compositions, for non-limiting example, pigments, colouring agents, fillers, photo-initiators, UV-absorbers, UV-stabilisers, anti-oxidants, sag control agents, bactericides, fungicides, anti-skinning agents, foam suppressing agents, drying stabilisers, finely dispersed waxes, and polymers.

Pigments useful in the current compositions may be natural or synthetic, transparent or non-transparent. Non-limiting examples of such pigments are titanium dioxide, red iron oxide, orange iron oxide, yellow iron oxide, phthalocyanine blue, phthalocyanine green, molybdate red, chromium titanate, and earth pigments, such as ochres, green earths, umbers, burnt Sienna, and raw Sienna. In translucent coating compositions pigments are generally employed in amounts of up to about 6 weight % and in opaque coating compositions pigments are generally employed in amounts of up to about 150 weight %, preferably about 50 to about 125 weight %, based on the solids content of the alkyd resin.

Suitable photo-initiators are, for non-limiting example, acyl phosphine oxides, available from BASF under the trademark Lucirin LR 8728.

Non-limiting examples of UV-absorbers are benzophenone and benzotriazole and their derivatives.

Subpigmentary titanium dioxide, available under the trade name TIOSORB from Tioxide Specialties Ltd., Billingham/Cleveland, England or under the trade name UV-TITAN from Kemira, Helsinki, Finland, and hindered amines (sometimes referred to as HALS for "hindered amine light stabilisers"), such as Tinuvin 123 from Ciba Geigy, Basel, Switzerland, are examples, but not an exhaustive listing, of UV-stabilisers known in the art and useful in the coating compositions of the current invention.

Non-limiting examples of sag control agents are inorganic agents, such as organically modified magnesium montmorillonites (available as Bentone 27 and Bentone 38 from Kronos bv, Rotterdam, The Netherlands) thixotropic alkyd resins based on polyamide (available from Cray Valley Ltd., Newport, England, under the trademark Gelkyd 9135W). Particularly desirable sag control agents are adducts of diisocyanate, for example, hexamethylene diisocyanate, to a monoamine or hydroxymonoamine having 1 to 15 aliphatic carbon atoms, such as benzylamine, such adducts available from Akzo Nobel Resins Inc., Bergen op Zoom, The Netherlands; adducts of a symmetrically aliphatic or homocyclic diisocyanate to a monoamine or diamine having at least a primary amino group and an ether group; and adducts of an isocyanurate trimer of a diisocyanate containing 3 to 20 carbon atoms to an amine having one or more primary amino groups.

Anti-skinning agents may also be components of the coating compositions of the invention, for non-limiting example "Exkin 2" available from Servo bv, Delden, The Netherlands.

Additives in the polymer form typically present in coating compositions, and applicable to the coating compositions disclosed herein, are, for non-limiting example, hydrocarbon resins, colophonium resins, phenol resins, and ketone resins.

Any known method can be used to apply the coating compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, *Paint and Surface Coatings: Theory and Practice*, Ellis Horwood, 1987, page 39 et seq.) The preferred application method is brushing.

Suitable substrates are, for non-limiting example, metals (such as iron, steel and aluminium), synthetic materials (such as plastics), wood, concrete, cement, brick, paper, and leather. The preferred substrate is wood. The substrates may be pretreated before application of the coating composition. The applied coat may be cured at ambient temperature, about 0° to 40° C.; however, curing can be accelerated by curing at temperatures above 40° C.

The invention is further disclosed and explained with reference to the following representative, though non-limiting, examples.

The examples herein were carried out using materials specified as follows.

1. Dehydrated castor oil fatty acid: Nouracid DE554 from Akzo Nobel Chemicals, Deventer, The Netherlands
2. Maleic anhydride: Pantochim SA, Belgium
3. Tall oil fatty acid: TOVZ from Arizona Chemical AB, Sandarne, Sweden
4. Pentaerythritol: Degussa, Frankfurt a/M, Germany
5. 2,2-dimethylol propionic acid: Perstorp Polyols AB, Perstorp, Sweden
6. Phosphoric acid: 30% from Caldic Netherlands bv, Rotterdam, The Netherlands
7. Trimellitic acid: Amoco, Geneva, Switzerland
8. Sunflower oil fatty acid: Nouracid HE30 from Akzo Nobel Chemicals, Deventer, The Netherlands
9. Shellsol®D70: organic solvent available from Shell Chemicals, The Netherlands
10. Shellsol®H: organic solvent available from Shell Chemicals, The Netherlands
11. Siccatol®Co, Siccatol®Ca, and Siccatol®Zr, cobalt, calcium, and Zr siccatives, respectively, available from Durham Chemicals, Durham, England
12. Tinuvin 123, a hindered amine light stabiliser (HALS) available from Ciba Geigy, Basel, Switzerland.
13. Calcium octoate 5% available from Borchers, as Octa Soligen CA (5%)
14. Bentone 38, organically modified magnesium montmorillonites available from Kronos, Rotterdam, The Netherlands
15. Monopropylene glycol: Bayer, Leverkusen, Germany
16. Monoethylene glycol: Caldic Netherland BV, Rotterdam, The Netherlands 17. Methylethyl ketoxime: anti-skinning agent available as Exkin 2 from Servo bv, Delden, The Netherlands Test Methods Employed The test methods used in the examples are as follows: The solids content was determined in accordance with ISO 3251-1993 at 125° C. in a forced-ventilation oven. Resin viscosity was measured with a Physica Rheometer cup Z2 in accordance with ISO 3219-1993 at 23° C. Coating viscosity was measured in accordance with the ICI cone & plate method at BS 3900 part 7A at a shear rate of 10 000 s$^{-1}$ in cPas. Acid values (also referred to as "acid numbers") and hydroxyl values (also referred to as "hydroxyl numbers," "OH numbers," and "OH values") are indicated in mg KOH per gram resin and were determined in accordance with ISO 3682 and ISO 4327, except that acetic anhydride was used instead of phthalic anhydride. Oil length was calculated as the weight of fatty acid plus the weight of an equimolar amount of glycerol, expressed as a percentage of the total weight of the finished resin.

Three (3) aluminium test panels measuring 4 cm by 5 cm were coated with a dry layer thickness of 35±5 μm of the relevant coating composition, then aged for 100 hours. The panels were exposed to a weather resistance test using a Suntest CPA+ apparatus available from Atlas Electric Devices, Chicago, Ill., U.S.A. Cracking and gloss were evaluated after the cycles indicated in Table 2. The results in Table 2 are averages from all test panels. One cycle is comprised of 102 minutes dry exposure and 18 minutes wet exposure to radiation of 765 W/m$^2$ (300–800nm). Cracking was evaluated using the TNO scale wherein "0" indicates no cracks and "10" indicates severe cracking. Gloss was measured at a 60° angle. Layer thickness was measured with an Isoscope, Fischer, Inc., Eindhoven, The Netherlands. Open Time and Tack Free Time were determined after a storage time of 2 weeks at 35° C. on a 90 μm wet film on a glass plate at 10° C. and 23° C. with a Beck-Koller drying recorder. Gloss at 20° was measured after drying of a 100 μm thick wet film on a glass plate, directly after drying or after 24 hrs drying at 50° C. Wrinkling was determined by visual observation of wet layer thicknesses of 100 μm, 120 μm, and 150 μm (translucent) and 300 μm (opaque) on glass panels. Results are reported on the "Sikkens" Scale where "12" indicates no wrinkling and "0" indicates severe wrinkling over the total glass surface.

Alkyd Resin Preparation

EXAMPLES 1, 2 AND COMPARATIVE EXAMPLE A

Alkyd resins were prepared as follows using components in concentrations listed in Table 1. Dehydrated castor oil fatty acid and maleic anhydride were charged to an ambient temperature 5-liter glass reactor. The reactor was heated to 185° C. The reactor was held at 185° C., and the reaction proceeded for one hour under nitrogen atmosphere. All remaining components were charged to the reactor, the temperature was increased to 250° C., and the reaction continued under xylene reflux until an acid value of between about 8 and 10 was reached (about 5 hours). The resin was removed from xylene, cooled to ambient temperature, then filtered. Characteristics of the resulting alkyd resins are also provided in Table 1.

The resins of Examples 1 and 2 are according to the invention. Comparative Example A is of the same type as disclosed in U.S. Pat. No. 5,053,483 and comprises an alkyd resin which does not contain component (d), such as 2,2-dimethylol propionic acid.

TABLE 1

Alkyd Resin Preparation

|  | Resin Ex. 1 | Resin Ex. 2 | Resin Comp. A |
|---|---|---|---|
| Dehydrated Castor oil Fatty Acid (g) | 823,0 | 819,9 | 923 |
| Maleic Anhydride (g) | 99,4 | 96,7 | 123,4 |
| Tall Oil Fatty Acid (g) | 1985 | 2055 | 1886,5 |
| Pentaerythritol (g) | 397,6 | 458,5 | 521,5 |
| 2,2-dimethylol propionic acid (g) | 194,4 | 70 | 0 |
| 1,4-Cyclohexane Dicarboxylic Acid (g) | 0 | 0 | 45,5 |
| Phosphoric Acid (g) | 1 | 1 | 1 |
| Properties of Alkyd Resin |  |  |  |
| Oil Length | 87,5 | 89,7 | 89,7 |
| Resin viscosity cPa.s | 100 | 145 | 470 |
| Mn | 1203 | 1465 | 1610 |
| Mw | 5389 | 10560 | 26700 |
| Dispersity | 4,48 | 7,2 | 16,0 |

The results listed in Table 1 show that the viscosity of alkyd resin A is much higher than that of the alkyd resin of Example 2 of the invention despite said two alkyd resins having the same oil length.

EXAMPLE 3

A series of translucent coating compositions were prepared employing the resins from Table 1.

Concentrations of the various components and properties of the resulting lacquers are detailed in Table 2.

The coating compositions detailed in Table 2 were prepared by charging the corresponding resin to a 3-liter Cowles stirred mixer. The Tinuvin, methylethyl ketoxime, Siccatol Co, and Siccatol Ca were added sequentially with stirring.

When addition was complete, the entire mixture was stirred for 2 minutes. With continued stirring, the iron oxide pigment was added, and the mixture was diluted with Shellsol H.

Cracking and gloss were determined after exposure to a weather resistance test, and wrinkling and drying were evaluated according to the earlier described test methods. Results are provided in Table 2.

TABLE 2

Coating Compositions

|  | Coating Comp. with resin of Ex. 2 | Coating Comp. with resin of Ex. 1 | Coating Comp. with resin A |
|---|---|---|---|
| Alkyd Resin (g) | 71,4 | 75,1 | 68,3 |
| FeO (g) | 2,30 | 2,30 | 2,30 |
| Siccatol Co (g) | 0,40 | 0,40 | 0,40 |
| Siccatol Ca (g) | 0,75 | 0,75 | 0,75 |
| Tinuvin 123 (g) | 0,70 | 0,70 | 0,70 |
| Methylethyl Ketoxime | 0,35 | 0,35 | 0,35 |
| Shellsol H (g) | 24,10 | 20,40 | 27,20 |
| Viscosity (cPa.s) | 28 | 28 | 28 |
| Solids Content (%) | 76 | 79 | 72 |
| VOC (g/l) | 230 | 200 | 265 |

TABLE 2-continued

| Properties Applied Coating Layers From | Coating Comp. with resin of Ex. 1 | Coating Comp. with resin of Ex. 2 | Coating Comp. with resin A |
|---|---|---|---|
| BK-drying at 10° C. Open Time (hrs) | 9,5 | 9 | 7,5 |
| Tack Free Time (hrs) | 15,5 | 16 | 11 |
| Gloss at 60° Initial | 81 | 82 | 82 |
| Wrinkling (layer thickness) 100 μm | 10 | 10 | 9 |
| Wrinkling 120 μm | 10 | 10 | 8 |
| Wrinkling 150 μm | 10 | 10 | 8 |
| Cracking after 1200 cycles | 0 | 0 | 0 |
| Gloss Retention After 600 cycles | 78 | 75 | 68 |
| Gloss Retention After 1200 cycles | 46 | 48 | 38 |

The results listed in Table 2 show that the solids content of the coating compositions containing the resins of Examples 1 and 2 is higher and the VOC lower than of the coating composition containing resin A according to U.S. Pat. No. 5, 053,483. From the data mentioned in Table 2 it also appears that after 600 and 1200 cycles the films according to the invention displayed better gloss at 60° and were better resistant to wrinkling than the applied film of the known coating composition.

EXAMPLE 4

336 pbw dehydrated castor oil fatty acid and 38,5 maleic anhydride were charged to an ambient temperature 5-liter glass reactor. The reactor was heated to 185° C. The reactor was held at 185° C., and the reaction proceeded for one hour under nitrogen atmosphere. 2300 pbw sunflower oil fatty acid, 434 pbw pentaerythritol, 192,5 pbw 2,2-dimethylol propionic acid, and 192,5 pbw trimellitic acid were charged to the reactor, and the reaction was allowed to proceed under xylene reflux until an acid value of about 8 to about 10 was reached (about 5 hours). The resin was removed from xylene, cooled to ambient temperature, then filtered. The resulting alkyd resin had the characteristics listed below.

| Viscosity (100% resin) | 370 cPa.s |
|---|---|
| Oil length | 84,04% |
| Mn | 2196 |
| Mw | 14 800 |

The above results show that the viscosity of the alkyd resin according to the invention is 100 cPa.s below the level of that of the resin of Comparative Example A, despite an oil length of 84,04% as compared with an oil length of 89,7% for Resin A. Note that the higher the oil length is, the worse the drying properties of the coating composition will be.

EXAMPLES 5, 6, 7, 8 , AND COMPARATIVE EXAMPLE B

In a manner analogous to that disclosed in Example 4, alkyd resins were prepared having a composition as given in Table 3.

TABLE 3

|  | Resin Ex. 5 | Resin Ex. 6 | Resin Ex. 7 | Resin Ex. 8 | Resin Comp. B |
|---|---|---|---|---|---|
| Adduct of dehydr. castor oil fatty acid and maleic anhydride | 374,5 | 374,5 | 374,5 | 374,5 | 794,5 |
| Sunfl. fatty acid | 1087 | 1149 | 1092 | 1155 | 2194 |
| Tall oil fatty acid | 1090 | 1152 | 1095 | 1158 | 0 |
| Pentaerythritol | 371 | 434 | 266 | 235 | 581 |
| Trimellitic acid | 192,5 | 192,5 | 91 | 0 | 192,5 |
| 2,2-dimethylol propionic acid | 385 | 192,5 | 577,5 | 577,5 | 0 |
| Properties of Alkyd Resin of | Ex. 5 | Ex. 6 | Ex. 7 | Ex. 8 | Comp. B |
| Oil Length % | 80,5 | 84,0 | 81,0 | 84,8 | 85,5 |
| Resin viscosity cPa.s | 490 | 370 | 180 | 35 | 1200 |
| Mn | 1355 | 1377 | 1261 | 1364 | 2150 |
| Mw | 11146 | 7605 | 6971 | 13305 | 22800 |
| Dispersity | 8,2 | 5,5 | 5,5 | 9,8 | 10,6 |

Concentrations of the various components and properties of the resulting lacquers are detailed in Table 4.

The coating compositions detailed in Table 4 were prepared by charging the corresponding resin to a 3-liter Cowles stirred mixer. The Tinuvin, methylethyl ketoxime, Siccatol Co, Siccatol Ca, and Siccatol Zr were added sequentially with stirring. When addition was complete, the entire mixture was stirred for 2 minutes. With continued stirring, the $TiO_2$ pigment was added, and the mixture was diluted with Shellsol D70 and White Spirit to obtain a paint having a viscosity of 55 cPas.

TABLE 4

| | Coating Compositions | | | | |
|---|---|---|---|---|---|
| | Coating Comp. with Resin Ex. 5 | Coating Comp. with Resin Ex. 6 | Coating Comp. with Resin Ex. 7 | Coating Comp. with Resin Ex. 8 | Coating Comp. with Resin Comp. B |
| Alkyd Resin (g) | 44,37 | 46,48 | 48,14 | 50,43 | 42,32 |
| Kronos 2310 ($TiO_2$) | 37,34 | 37,34 | 37,34 | 37,34 | 37,34 |
| Shellsol D70 | 7,33 | 7,33 | 7,33 | 7,33 | 9,58 |
| methylethyl ketoxime | 0,41 | 0,41 | 0,41 | 0,41 | 0,41 |
| Siccatol Co-10 | 0,44 | 0,44 | 0,44 | 0,44 | 0,44 |

TABLE 4-continued

|  | Coating Compositions | | | | |
|---|---|---|---|---|---|
|  | Coating Comp. with Resin Ex. 5 | Coating Comp. with Resin Ex. 6 | Coating Comp. with Resin Ex. 7 | Coating Comp. with Resin Ex. 8 | Coating Comp. with Resin Comp. B |
| Siccatol Ca-5 | 2,53 | 2,53 | 2,53 | 2,53 | 2,53 |
| Siccatol Zr-18 | 1,52 | 1,52 | 1,52 | 1,52 | 1,52 |
| White Spirit | 6,06 | 3,95 | 2,29 |  | 5,86 |
| Total | 100 | 100 | 100 | 100 | 100 |
| Solid Content (wt. %) Paint | 82,1 | 83,6 | 86,9 | 88,3 | 79,6 |
| Viscosity Paint cPas | 55 | 55 | 55 | 27 | 55 |

From the results mentioned in Table 4 it appears that the solids content of the coating compositions containing an alkyd resin according to the invention is much higher than that of coating compositions of the type disclosed in U.S. Pat. No. 5,053,483. With the used paint formulation and the alkyd resin of Example 8 it was impossible to obtain a coating composition having a viscosity of 55 cPas.

The properties of the films obtained by application of the above coating compositions on a glass plate are listed in Table 5.

TABLE 5

|  | Properties of films obtained with | | | | |
|---|---|---|---|---|---|
|  | Coating Comp. with Resin of Ex. 5 | Coating Comp. with Resin of Ex. 6 | Coating Comp. with Resin of Ex. 7 | Coating Comp. with Resin of Ex. 8 | Coating Comp. with Resin of Comp. B |
| Wrinkling at film thickness of 300 μm at the beginning | 5 | 5 | 5 | 4 | 5 |
| after 1 week | 4 | 4 | 3 | 2 | 4 |
| Gloss at 20° for a 100 μm film | 82 | 81 | 80 | 81 | 77 |
| Gloss at 20° for a 100 μm film after 24 hrs at 50° C. | 77 | 74 | 74 | 77 | 70 |
| BK-drying at 10° C., hrs |  |  |  |  |  |
| Open Time | 4:50 | 4:45 | 5:10 | 7:30 | 4:30 |
| Dust free | — | 5:15 | — | — | — |
| Tack free | 5:45 | 5:45 | 6:00 | 9:10 | 5:30 |
| BK-drying at 23° C., hrs |  |  |  |  |  |
| Open Time | 2:10 | 2:40 | 2:15 | 3:45 | 2:00 |
| Dust free | — | — | — | — | — |
| Tack free | 2:40 | 3:00 | 2:50 | 4:15 | 2:30 |

From the results listed in Table 5 it appears that the properties of the coating layers obtained with the coating compositions according to the invention despite their higher solids content are comparable with those of the known coating layer containing Resin B of the type as disclosed in U.S. Pat. No. 5,053,483.

We claim:

1. An alkyd resin comprising
   a) about 5 to about 40 weight % of the adduct of an α,β-unsaturated dicarboxylic acid to an unsaturated fatty acid,
   b) about 50 to about 90 weight % of an unsaturated fatty acid which is not part of an adduct,
   c) about 8 to about 18 weight % of a polyol free from carboxylic groups, and
   d) about 1 to about 30 weight % of an at least two hydroxyl groups-containing monocarboxylic acid.

2. The alkyd resin of claim 1 which also contains up to about 10 weight % of a dicarboxylic and/or a tricarboxylic acid.

3. The alkyd resin of claim 1 which also contains up to about 15 weight % of one or more monomers other than the monomers (a) through (e).

4. The alkyd resin of claim 1 wherein (i) the α,β-unsaturated dicarboxylic acid is selected from the group consisting of maleic acid, fumaric acid, itaconic acid, mesaconic acid, methyl maleic acid, and ethyl maleic acid, and (ii) the unsaturated fatty acid, whether forming part of the adduct or not, is selected from the group consisting of dehydrated castor oil fatty acid, tall oil fatty acid, linseed fatty acid, soybean fatty acid, corn oil fatty acid, cotton seed oil fatty acid, lard fatty acid, mustard seed oil fatty acid, olive oil fatty acid, palm oil fatty acid, peanut oil fatty acid, rapeseed oil fatty acid, rice bran oil fatty acid, safflower oil fatty acid, sesame oil fatty acid, sunflower oil fatty acid, tallow fatty acid, linoleic acid, and linolenic acid.

5. The alkyd resin of claim 1 wherein for the preparation of the adduct use is made of maleic anhydride and dehydrated castor oil fatty acid.

6. The alkyd resin of claim 1 wherein the unsaturated fatty acid not forming part of the adduct is tall oil fatty acid, sunflower oil fatty acid, soybean oil fatty acid or a mixture thereof.

7. The alkyd resin of claim 1 wherein the polyol free from carboxylic groups is selected from the group of ethylene glycol, propylene glycol, 1,4-butane diol, neopentyl glycol, glycerol, trimethylol ethane, trimethylol propane, pentaerythritol, dipentaerythritol, tripentaerythritol, tetrapentaerythritol, hexane diol, cyclohexane diols, sorbitol, and glucosides.

8. The alkyd resin of claim 1 wherein the at least two hydroxyl groups-containing monocarboxylic acid is selected from the group of 2,2-dimethylol propionic acid, 2,2-dimethylol butyric acid, 2,2,2,-trimethylol acetic acid, 2,2-dimethylol valeric acid, 2,2-hydroxypropionic acid, and 3,5-dihydroxybenzoic acid.

9. A coating composition comprising the alkyd resin of claim 1.

10. A non-aqueous coating composition comprising the alkyd resin of claim 1, said coating composition having a VOC of less than 280 g/l.

11. The coating composition of claim 10 wherein the VOC is less than 250.

12. The coating composition of claim 10 wherein the VOC is less than 170.

* * * * *